(12) United States Patent
Arai et al.

(10) Patent No.: US 12,097,811 B2
(45) Date of Patent: Sep. 24, 2024

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Kenta Arai, Mie (JP); Daisuke Ebata, Mie (JP); Ryusuke Kudo, Mie (JP); Masaki Mizushita, Mie (JP); Tetsuya Nishimura, Mie (JP); Haruka Nakano, Mie (JP); Housei Mizuno, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 178 days.

(21) Appl. No.: 17/777,485

(22) PCT Filed: Nov. 9, 2020

(86) PCT No.: PCT/JP2020/041685
§ 371 (c)(1),
(2) Date: May 17, 2022

(87) PCT Pub. No.: WO2021/100511
PCT Pub. Date: May 27, 2021

(65) Prior Publication Data
US 2023/0082327 A1    Mar. 16, 2023

(30) Foreign Application Priority Data
Nov. 21, 2019   (JP) .................... 2019-210363

(51) Int. Cl.
*B60R 16/02*   (2006.01)
*H01B 7/00*    (2006.01)

(52) U.S. Cl.
CPC ....... *B60R 16/0215* (2013.01); *H01B 7/0045* (2013.01)

(58) Field of Classification Search
None
See application file for complete search history.

(56) References Cited

U.S. PATENT DOCUMENTS 1,384,583 A * 7/1921 Wood .................. B60R 16/0215
                                                24/19
3,128,214 A * 4/1964 Lay ..................... H01B 13/012
                                                174/72 A (Continued)

FOREIGN PATENT DOCUMENTS

CN   104347162    2/2015
CN   205092390 U  3/2016

(Continued)

OTHER PUBLICATIONS

China Office Action issued in China Patent Application No. 202080079373.6, dated Sep. 14, 2023, together with English translation thereof.

(Continued)

*Primary Examiner* — Timothy J. Dole
*Assistant Examiner* — Muhammed Azam
(74) *Attorney, Agent, or Firm* — Greenblum & Bernstein, P.L.C.

(57) ABSTRACT

A wiring member includes: at least one wire-like transmission member; a first sheet to which a first section located along a longitudinal direction in the wire-like transmission member is fixed; and a second sheet to which a second section located along a longitudinal direction in the wire-like (Continued)

transmission member is fixed, wherein the first sheet and the second sheet are separated, and at least one bending trace is formed in an intermediate section between the first section and the second section in the wire-like transmission member.

7 Claims, 6 Drawing Sheets

(56) References Cited

U.S. PATENT DOCUMENTS

| | | | | |
|---|---|---|---|---|
| 4,783,578 | A * | 11/1988 | Bodensiek | H01B 7/08 174/117 F |
| 8,946,551 | B2 * | 2/2015 | Hudson | H01B 7/0045 174/72 A |
| 9,731,665 | B2 * | 8/2017 | Wakabayashi | B60R 16/0215 |
| 11,170,914 | B2 * | 11/2021 | Mizuno | H02G 3/30 |
| 11,322,270 | B2 * | 5/2022 | Mizushita | H01B 13/01209 |
| 11,387,015 | B2 * | 7/2022 | Fukushima | H01B 7/0846 |
| 11,552,462 | B2 * | 1/2023 | Nishimura | B60R 16/0215 |
| 11,569,004 | B2 * | 1/2023 | Nakano | H01B 7/08 |
| 11,735,336 | B2 * | 8/2023 | Nakano | H01B 7/40 174/95 |
| 11,837,861 | B2 * | 12/2023 | Ishida | B60R 16/0207 |
| 2001/0042636 | A1 * | 11/2001 | Biron | H05K 3/4092 174/254 |
| 2011/0111633 | A1 * | 5/2011 | Sugami | H01R 24/62 29/428 |
| 2013/0065336 | A1 * | 3/2013 | Takagi | H01S 5/0202 438/33 |
| 2014/0332267 | A1 * | 11/2014 | Tanaka | H01B 13/01254 72/370.26 |
| 2015/0136478 | A1 * | 5/2015 | Biesse | B64C 1/406 174/72 A |
| 2017/0327060 | A1 * | 11/2017 | Nakajima | H01B 13/01254 |
| 2017/0373204 | A1 * | 12/2017 | Corneille | H01L 31/0512 |
| 2018/0301832 | A1 * | 10/2018 | Coakley | H01R 12/69 |
| 2019/0043642 | A1 * | 2/2019 | Mizuno | B32B 5/06 |
| 2019/0089142 | A1 | 3/2019 | Sugino | |
| 2019/0252092 | A1 * | 8/2019 | Mizuno | B60R 16/0215 |
| 2019/0392963 | A1 | 12/2019 | Ishida et al. | |
| 2020/0274343 | A1 | 8/2020 | Sugino | |
| 2021/0035712 | A1 * | 2/2021 | Mizuno | B60R 16/0215 |
| 2022/0093288 | A1 * | 3/2022 | Fukushima | H02G 3/30 |
| 2022/0181044 | A1 * | 6/2022 | Yasuda | H01B 7/0823 |
| 2022/0208415 | A1 * | 6/2022 | Nishimura | H02G 3/30 |
| 2022/0212614 | A1 * | 7/2022 | Sumida | B60R 16/0215 |
| 2022/0234526 | A1 * | 7/2022 | Sumida | H01B 7/36 |
| 2022/0246325 | A1 * | 8/2022 | Sumida | H01B 7/08 |
| 2022/0293299 | A1 * | 9/2022 | Kudo | H02G 3/0406 |
| 2022/0375646 | A1 * | 11/2022 | Kudo | H02G 3/305 |
| 2022/0388462 | A1 * | 12/2022 | Nishimura | H02G 3/30 |
| 2022/0407295 | A1 * | 12/2022 | Kudo | H02G 3/0406 |
| 2023/0047047 | A1 * | 2/2023 | Nishimura | H02G 3/30 |
| 2023/0082327 | A1 * | 3/2023 | Arai | H02G 3/305 174/72 A |
| 2023/0106640 | A1 * | 4/2023 | Nakano | H02G 3/0418 174/72 A |
| 2023/0119133 | A1 * | 4/2023 | Mizushita | B60R 16/0215 174/110 R |
| 2023/0122992 | A1 * | 4/2023 | Kou | H01B 7/18 174/72 A |
| 2023/0150442 | A1 * | 5/2023 | Komori | H02G 3/04 174/72 A |
| 2023/0154647 | A1 * | 5/2023 | Kou | H02G 3/04 174/72 A |

FOREIGN PATENT DOCUMENTS

| | | | | |
|---|---|---|---|---|
| CN | 107005038 | | 8/2017 | |
| CN | 108630342 | | 10/2018 | |
| CN | 109510123 | | 3/2019 | |
| CN | 113874963 | B * | 4/2024 | |
| JP | 02-017879 | U | 2/1990 | |
| JP | 09-306244 | | 11/1997 | |
| JP | 2003168327 | A * | 6/2003 | B60R 16/0207 |
| JP | 2013-145672 | | 7/2013 | |
| JP | 2013-255341 | | 12/2013 | |
| JP | 2015-053262 | | 3/2015 | |
| JP | 2018-137208 | | 8/2018 | |
| WO | WO-9403026 | A1 * | 2/1994 | H04R 9/025 |
| WO | WO-2013057974 | A1 * | 4/2013 | B60R 16/0215 |
| WO | 2015/122431 | | 8/2015 | |
| WO | 2016/098657 | | 6/2016 | |
| WO | WO-2018030085 | A1 * | 2/2018 | H01B 13/012 |

OTHER PUBLICATIONS

International Search Report issued in International Patent Application No. PCT/JP2020/041685, dated Jan. 12, 2021, along with an English translation thereof.
International Preliminary Report on Patentability issued in International Patent Application No. PCT/JP2020/041685, dated Aug. 13, 2021, along with an English translation thereof.
Japan Office Action issued in Japan Patent Application No. 2019-210363, dated Apr. 4, 2023, together with English translation thereof.
Office Action issued in Corresponding CN Patent Application No. 202080079373.6, dated Apr. 26, 2024, along with an English translation thereof.

* cited by examiner

WIRING MEMBER

TECHNICAL FIELD

The present disclosure relates to a wiring member.

BACKGROUND ART

Patent Document 1 discloses a wire harness in which an electrical wire is welded to a functional exterior member formed into a sheet-like shape.

PRIOR ART DOCUMENTS

Patent Documents

Patent Document 1: Japanese Patent Application Laid-Open No. 2018-137208

SUMMARY

Problem to be Solved by the Invention

A wire harness described in Patent Document 1 is bended at a time of transportation, for example, in some cases. The wire harness is desired to be bended at a constant position.

Thus, an object is to provide a technique of easily bending a wiring member at a constant position.

Means to Solve the Problem

A wiring member according to the present disclosure is a wiring member including: at least one wire-like transmission member; a first sheet to which a first section located along a longitudinal direction in the wire-like transmission member is fixed; and a second sheet to which a second section located along a longitudinal direction in the wire-like transmission member is fixed, wherein the first sheet and the second sheet are separated, and at least one bending trace is formed in an intermediate section between the first section and the second section in the wire-like transmission member.

Effects of the Invention

According to the present disclosure, the wiring member is easily bended at a constant position.

DESCRIPTION OF EMBODIMENT(S)

Description of Embodiment of Present Disclosure

Embodiments of the present disclosure are listed and described firstly.

A wiring member according to the present disclosure is as follows.

(1) A wiring member includes: at least one wire-like transmission member; a first sheet to which a first section located along a longitudinal direction in the wire-like transmission member is fixed; and a second sheet to which a second section located along a longitudinal direction in the wire-like transmission member is fixed, wherein the first sheet and the second sheet are separated, and at least one bending trace is formed in an intermediate section between the first section and the second section in the wire-like transmission member. In the intermediate section where the bending trace is formed in the wire-like transmission member is not fixed to any of the first sheet and the second sheet. Thus, when the intermediate section is used as a guide at a time of bending, the wiring member is easily bended at a constant position. A region of the intermediate section in the wiring member tends to have lower rigidity than a region of the first section and a region of a second section. Stress is easily concentrated in the region of the intermediate section at the time of bending, thus the wiring member is easily bended at a constant position.

(2) The first sheet and the second sheet may be provided separately from each other along the longitudinal direction of the wire-like transmission member. Accordingly, the wire-like transmission member is easily fixed to the first sheet and the second sheet separately. An operator can easily find the intermediate section as a guide of bending the wiring member.

(3) A whole portion of the wire-like transmission member located along a longitudinal direction of the intermediate section may be covered by at least one of the first sheet and the second sheet. Accordingly, the wire-like transmission member is protected by at least one of the first sheet and the second sheet in the intermediate section.

(4) A route bending portion where the wire-like transmission member is bended over a range larger than a range where the bending trace is formed may be provided in the intermediate section. Accordingly, the intermediate section is also used as the route bending portion.

(5) The route bending portion may also be a planar route bending portion in which the first sheet and the second sheet extend in an identical planar surface. Accordingly, the intermediate section is also used as the planar route bending portion.

(6) The route bending portion may also be a three-dimensional route bending portion in which the first sheet and the second sheet extend in a planar surface different from each other. Accordingly, the intermediate section is also used as the three-dimensional route bending portion.

(7) It is also applicable that a first direction in which the wire-like transmission member extends from the first sheet and a second direction in which the wire-like transmission member extends from the second sheet are parallel to each other, and the first direction and the second direction deviate in a direction perpendicular to the first direction and the second direction. Accordingly, when the wire-like transmission member extends in one direction, the wiring member can be disposed away from an obstacle.

(8) Both side portions of the bending trace in the intermediate section in the wire-like transmission member may extend in an identical straight form. Accordingly, the wiring member is bended in a section where the wire-like transmission member is disposed in a straight form.

(9) It is also applicable that the plurality of wire-like transmission members are provided in the intermediate section, the bending traces are formed in the plurality of wire-like transmission members, respectively, and the plurality of bending traces are arranged in one direction. Accordingly, the wiring member is bended in a section where the plurality of wire-like transmission members are parallelly arranged.

(10) It is also applicable that the plurality of wire-like transmission members are parallelly arranged in the intermediate section, and the plurality of bending traces are arranged in a direction parallel to a direction in which the plurality of wire-like transmission members are arranged. Accordingly, the plurality of wire-like transmission members are bended at an angle of 90 degrees with respect to a longitudinal direction.

(11) It is also applicable that the plurality of wire-like transmission members are parallelly arranged in the intermediate section, and the plurality of bending traces are arranged in a direction intersecting with a direction in which the plurality of wire-like transmission members are arranged. Accordingly, the plurality of wire-like transmission members are bended at an angle smaller than 90 degrees with respect to the longitudinal direction.

(12) A wiring member according to the present disclosure is a wiring member including: at least one wire-like transmission member; a first sheet to which a first section located along a longitudinal direction in the wire-like transmission member is fixed; and a second sheet to which a second section located along a longitudinal direction in the wire-like transmission member is fixed, wherein the first sheet and the second sheet are separated, and the wire-like transmission member is folded at an intermediate section between the first section and the second section. The wire-like transmission member is not fixed to any of the first sheet and the second sheet in the intermediate section. Thus, when the intermediate section is used as a guide at a time of bending, the wiring member is easily bended at a constant position. The intermediate section tends to have lower rigidity than the first section and the second section. Stress is easily concentrated in the intermediate section at the time of bending, thus the wiring member is easily bended at a constant position.

Details of Embodiment of Present Disclosure

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment 1

Figure 1:
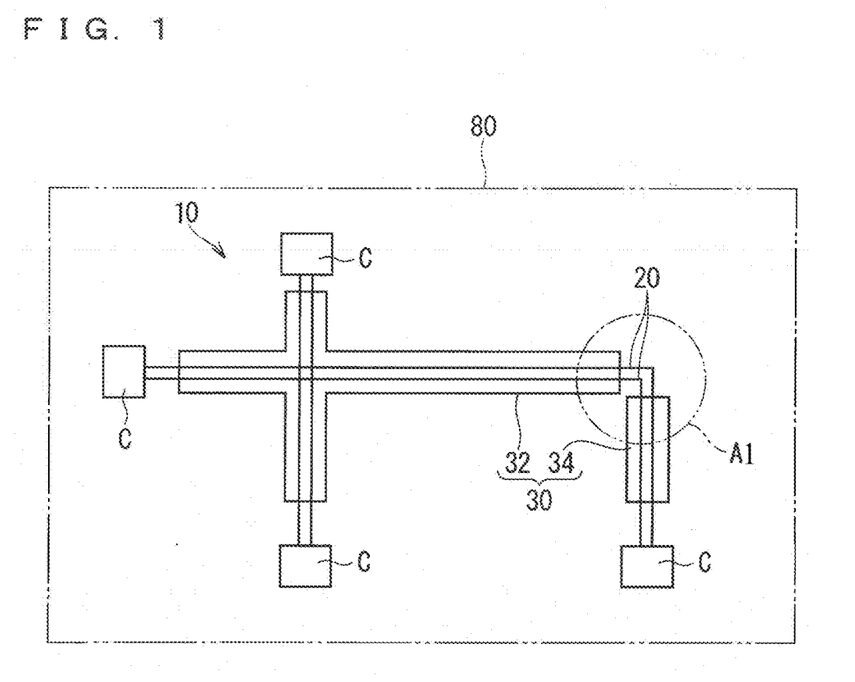
FIG. 1 is a schematic plan view illustrating a wiring member according to an embodiment 1.
Figure 2:
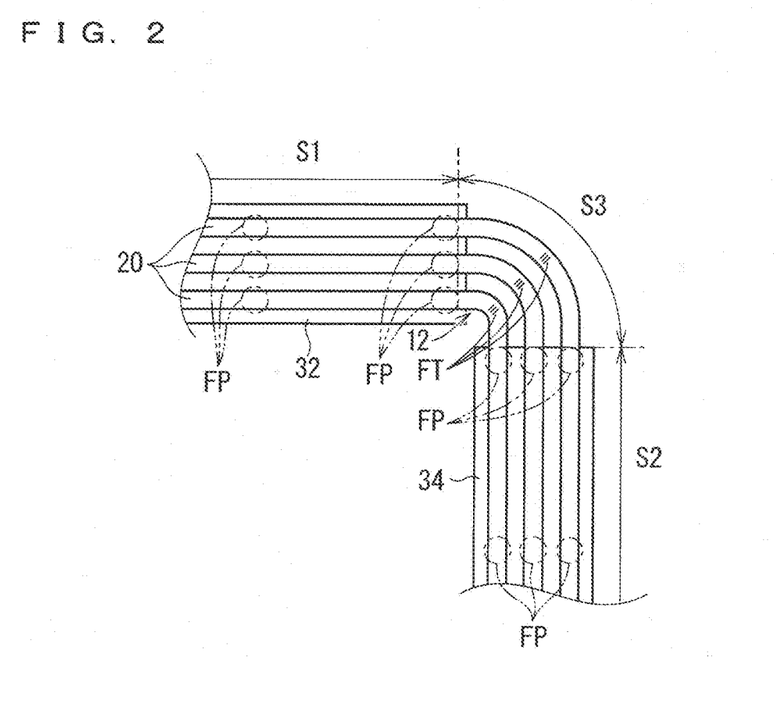
FIG. 2 is an enlarged view of a region A1 in FIG. 1.
Figure 3:
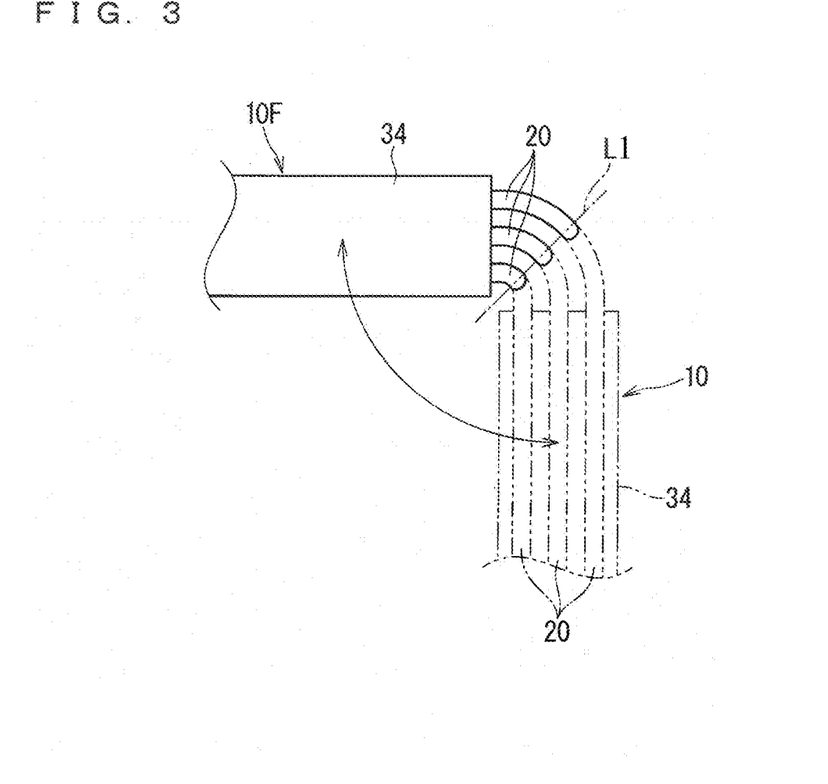
FIG. 3 is an explanation diagram illustrating that the wiring member according to the embodiment 1 is bended.
Figure 4:
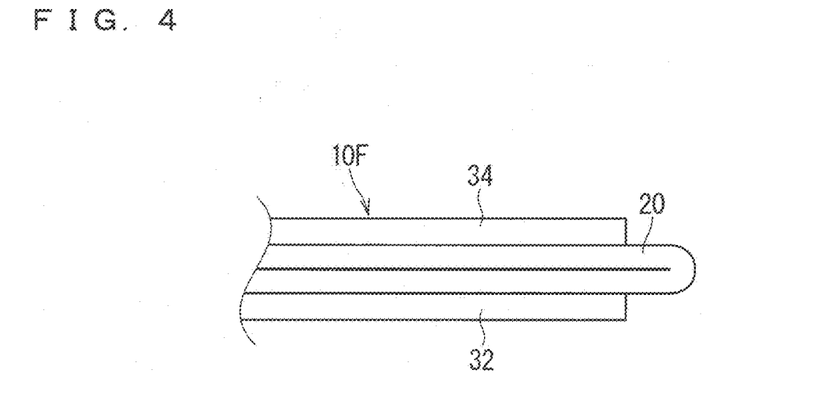
FIG. 4 is a side view illustrating the folded wiring member.

A wiring member according to an embodiment 1 is described hereinafter. FIG. 1 is a schematic plan view illustrating a wiring member 10 according to the embodiment 1. FIG. 2 is an enlarged view of the region A1 in FIG. 1. FIG. 3 is an explanation diagram illustrating that the wiring member 10 according to the embodiment 1 is bended. FIG. 4 is a side view illustrating the folded wiring member 10. When the wiring member 10 in a folded state as illustrated in FIG. 4 needs to be distinguished from the wiring member 10 in a developed state as illustrated in FIG. 2, a sign F is assigned to the wiring member 10 to be referred to as the wiring member 10F in some cases.

The wiring member 10 includes a wire-like transmission member 20 and a fixing sheet 30. The wire-like transmission member 20 is fixed to the fixing sheet 30. The wiring member 10 is mounted to a vehicle, for example. The wiring member 10 is disposed in an arrangement target 80 in a vehicle. The arrangement target 80 is, for example, a body frame, a body panel, and an interior panel in a vehicle. The arrangement target 80 includes an arrangement surface. For example, the wiring member 10 is disposed in the arrangement target 80 while the fixing sheet 30 extends on the arrangement surface. A portion of the wire-like transmission member 20 fixed to the fixing sheet 30 is kept in an extended state along an arrangement route. Accordingly, the wiring member 10 is simply disposed in the arrangement target 80.

At least one wire-like transmission member 20 is included. Herein, the plurality of wire-like transmission members 20 are included. Each wire-like transmission member 20 is a wire-like member transmitting electrical power or light. The fixing sheet 30 is formed into a flat shape as a whole. The plurality of wire-like transmission members 20 are fixed to the fixing sheet 30, thus the wiring member 10 is kept in a flat state. In the example illustrated in FIG. 2, the plurality of wire-like transmission members 20 having the same diameter and structure are disposed on one fixing sheet 30. However, the diameter and the structure of each of the plurality of wire-like transmission members 20 may be appropriately set, thus the wire-like transmission members 20 each having a different diameter and a structure, for example, may be disposed on the same fixing sheet 30.

The plurality of wire-like transmission members 20 are assumed to be members connecting components in a vehicle. A connector C, for example, is provided on an end portion of the wire-like transmission member 20. This connector C is connected to a connector provided in the other side component, thus the wire-like transmission member 20 is connected to the other side component. That is to say, the present wiring member 10 is used as the wiring member 10 electrically connecting various types of component in a vehicle, for example (or connecting them so that they can perform optical communication). The connector C may be fixed to the fixing sheet 30.

Routes of the plurality of wire-like transmission members 20 are set in accordance with a position of a component to which the wire-like transmission members 20 are connected. The plurality of wire-like transmission members 20 are fixed to the fixing sheet 30, thus the plurality of wire-like transmission members 20 are kept in a form following a wiring route corresponding to a position of a component as a connection destination of each wire-like transmission member 20. The plurality of wire-like transmission members 20 may be fixed to the fixing sheet 30 in a state where a branch wire is branched from a main wire. The fixing sheet 30 may also be formed in a shape in which a portion to which the branch wire is fixed is branched from a portion to which the main wire is fixed. Herein, the plurality of wire-like transmission members 20 are branched on the fixing sheet 30.

The wire-like transmission member 20 includes a transmission wire body and a covering layer, for example. The transmission wire body transmits an electrical power or light, for example. The covering layer covers the transmission wire body. For example, the wire-like transmission member 20 may be a general wire having a core wire and a covering layer around the core wire, or may also be a shielded wire, a twisted wire, an enamel wire, a nichrome wire, or an optical fiber. The wire-like transmission member 20 may be an electrical wire such as a bare wire which does not include the covering layer.

The wire-like transmission member 20 transmitting the electrical power may be various kinds of signal lines or various kinds of power lines. Some of the wire-like transmission members 20 transmitting the electrical power may be used as an antenna or coil, for example, transmitting or receiving a signal or electrical power to or from a space.

The wire-like transmission member 20 may be a single wire-like object or a composite object of a plurality of wire-like objects (a twisted wire and a cable made up of a plurality of wire-like objects covered by a sheath).

The wire-like transmission member 20 is fixed to one main surface of the fixing sheet 30. A fixing structure of the wire-like transmission member 20 fixed to the fixing sheet 30 is not particularly limited as long as the wire-like transmission member 20 is fixed to the fixing sheet 30. Applicable as the fixing state are a contact area fixation and a non-contact area fixation, or both fixations may be used together. Herein, the contact area fixation indicates that a portion where the wire-like transmission member 20 and the fixing sheet 30 have contact with each other is stuck and fixed. The non-contact area fixation is a fixing state which is not the contact area fixation, and indicates that a sewing thread, a cover, or an adhesive tape presses the wire-like transmission member 20 toward the fixing sheet 30 or sandwiches the wire-like transmission member 20 and the fixing sheet 30 to keep them in a fixing state. In the description hereinafter, the wire-like transmission member 20 and the fixing sheet 30 are in the state of the contact area fixation.

Applicable as the configuration of the contact area fixation are a contact area indirect fixation and a contact area direct fixation, or both fixations may also be used together in different regions. Herein, the contact area indirect fixation indicates that the wire-like transmission member 20 and the fixing sheet 30 are indirectly stuck and fixed via an adhesive agent, a gluing agent, and a double-sided adhesive tape provided therebetween. The contact area direct fixation indicates that the wire-like transmission member 20 and the fixing sheet 30 are directly stuck and fixed without an intervention of the adhesive agent, for example, which is separately provided. Considered in the contact area direct fixation is that resin included in at least one of the wire-like transmission member 20 and the fixing sheet 30 is melted, thus the wire-like transmission member 20 and the fixing sheet 30 are stuck and fixed, for example.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but a known means such as welding, fusion, and melting joint can be used. For example, when the state of the contact area direct fixation by the heat is formed by welding, various welding means such as ultrasonic welding, heating-pressurizing welding, hot air welding, and high frequency welding can be adopted. When the suite of the contact area direct fixation is formed by these means, the wire-like transmission member 20 and the fixing sheet 30 are in the state of the contact area direct fixation by these means. Specifically, when the state of the contact area direct fixation is formed by the ultrasonic welding, for example, the wire-like transmission member 20 and the fixing sheet 30 are in the state of the contact area direct fixation by the ultrasonic welding.

In the description hereinafter, the wire-like transmission member 20 and the fixing sheet 30 are in the state of the contact area direct fixation.

The fixing sheet 30 may have a single layer structure. When the fixing sheet 30 has the single layer structure, the one layer is a fixing layer to which the wire-like transmission member 20 is fixed. The fixing sheet 30 may be a resin sheet. For example, the fixing sheet 30 may be formed of resin such as polyvinyl chloride (PVC), polyethylene (PE), polypropylene (PP), or polyethylene terephthalate (PET). The fixing sheet 30 may be a sheet having an evenly filled cross-sectional surface. The fixing sheet 30 is also considered a fibrous material such as a braided cloth, a woven cloth, or a non-woven cloth, for example. The fixing sheet 30 is also considered a foam sheet, for example. The fixing sheet 30 may be a metal sheet.

The fixing sheet 30 may also have a multilayer structure. When the fixing sheet 30 has the multilayer structure, various types of sheet described in the single layer structure described above is adopted to the sheet constituting the fixing layer. Various types of sheet described in the single layer structure described above and a sheet which is not suited for fixation of the wire-like transmission member 20 may be adopted to the sheet which does not constitute the fixing layer. The fixing sheet 30 includes a first layer and a second layer stacked on each other, for example.

The first layer is a fixing layer. Any layer is not particularly limited but can be used as the first layer as long as it can fix the wire-like transmission member 20 to the fixing sheet 30. For example, the first layer may also be a resin layer evenly filled with resin and having an evenly filled cross-sectional surface. The wire-like transmission member 20 is fixed by the first layer. Resin as a material of the first layer is the same as that of the covering layer, for example. One surface of the first layer is one main surface of the fixing sheet 30.

The second layer is a layer for adding or reinforcing a function such as protection. For example, the second layer is a fibrous material layer. One surface of the second layer is the other main surface of the fixing sheet 30. The first layer and the second layer are fixed by adhesion or fusion, for example.

The fixing sheet 30 may be a flexible member. For example, the first layer is a resin layer having an evenly filled cross-sectional surface made up of flexible resin such as soft PVC as a material, the second layer is a non-woven cloth made up of PET as a material, and the fixing sheet 30 is a flexible member. For example, the fixing sheet 30 may have a plastic property so as to be able to follow bending of the wire-like transmission member 20. That is to say, it is also applicable that the wiring member 10 can be bended in a thickness direction (bending so that a fold line follows the main surface of the fixing sheet 30). The fixing sheet 30 may have rigidity to an extent of being able to maintain a planar surface in a state where the wiring member 10 is raised.

Each of the plurality of wire-like transmission members 20 is fixed to the fixing sheet 30 at a plurality of positions at intervals along the longitudinal direction. In FIG. 2, fixing positions FP where the wire-like transmission members 20 and the fixing sheet 30 are fixed are indicated by dashed-two dotted lines. Each of the plurality of wire-like transmission members 20 may be wholly fixed to the fixing sheet 30 continuously along the longitudinal direction.

Herein, a first sheet 32 and a second sheet 34 are provided as the fixing sheet 30. The first sheet 32 and the second sheet 34 are separated from each other. The state where the first sheet 32 and the second sheet 34 are separated from each other indicates that the first sheet 32 and the second sheet 34 are not connected to each other but are separately formed. The first sheet 32 and the second sheet 34 are separated from each other, thus can be mutually moved in a form different from each other. The first sheet 32 and the second sheet 34 are separated from each other, thus only one of them can be removed. Herein, the first sheet 32 and the second sheet 34 are assumed to be the same type of sheet. However, the first sheet 32 and the second sheet 34 may be different types of sheet.

The first sheet 32 and the second sheet 34 may be or may not be overlapped with each other. The first sheet 32 and the second sheet 34 may be or may not have contact with each other. In the example illustrated in FIG. 2, the first sheet 32 and the second sheet 34 are provided away from each other along the longitudinal direction of the wire-like transmission member 20. An interval between the first sheet 32 and the second sheet 34 along the longitudinal direction of the wire-like transmission member 20 is not particularly limited. For example, as illustrated in FIG. 2, when a route bending portion 12 described hereinafter is provided in an intermediate section S3, the interval between the first sheet 32 and the second sheet 34 may be set so that the route bending portion 12 does not reach the first sheet 32 and the second sheet 34.

A first section S1 located along the longitudinal direction of the wire-like transmission member 20 is fixed to the first sheet 32. A second section S2 located along the longitudinal direction of the wire-like transmission member 20 is fixed to the second sheet 34. A section between the first section S1 and the second section S2 in the wire-like transmission member 20 is the intermediate section S3. A bending trace FT is formed in the intermediate section S3.

The first section S1 is a section ranging from one end to the other end of the wire-like transmission member 20 fixed to the first sheet 32. In the example illustrated in FIG. 2, a portion of the wire-like transmission member 20 overlapped with an end edge of the first sheet 32 is not fixed to the first sheet 32. The first section S1 does not include a portion of the wire-like transmission member 20 which is overlapped with the end edge of the first sheet 32 but is not fixed to the first sheet 32.

The second section S2 is a section ranging from one end to the other end of the wire-like transmission member 20 fixed to the second sheet 34. In the example illustrated in FIG. 2, a portion of the wire-like transmission member 20 overlapped with an end edge of the second sheet 34 is fixed to the second sheet 34. In this case, the second section S2 includes a portion of the wire-like transmission member 20 which is overlapped with the end edge of the second sheet 34 and is fixed to the second sheet 34.

The intermediate section S3 is a section between the first section S1 and the second section S2. As illustrated in FIG. 2, the intermediate section S3 includes a portion of the wire-like transmission member 20 which is overlapped with the end edge of the first sheet 32 but is not fixed to the first sheet 32. The intermediate section S3 does not include a portion of the wire-like transmission member 20 which is overlapped with the end edge of the second sheet 34 and is fixed to the second sheet 34.

The portion of the wire-like transmission member 20 overlapped with the end edge of the first sheet 32 may be fixed to the first sheet 32. In this case, the portion of the wire-like transmission member 20 overlapped with the end edge of the first sheet 32 is not included in the intermediate section S3 but is included in the first section S1. The portion of the wire-like transmission member 20 overlapped with the end edge of the second sheet 34 may not be fixed to the second sheet 34. In this case, a portion of the wire-like transmission member 20 which is overlapped with the end edge of the second sheet 34 but is not fixed to the second sheet 34 is not included in the second section S2 but is included in the intermediate section S3.

The wire-like transmission member 20 is bended at a portion of a bending reference line L1 as illustrated in FIG. 3, for example. The wiring member 10F in which the wire-like transmission member 20 is bended enters a folded state as illustrated in FIG. 4 in some cases. For example, a packing form at a time of transporting the wiring member 10 may be the wiring member 10F in a folded state. The bending trace FT is a trace left in a portion bended in the wire-like transmission member 20 when the wiring member 10F in the folded state is developed to be the wiring member 10 at a time of being assembled to a vehicle, for example.

For example, a portion remaining as a fold line in at least one of a transmission wire body and the covering layer in the wire-like transmission member 20 is the bending trace FT. For example, a crease may be formed as a fold line in the covering layer. The crease is formed to extend along the fold line. Accordingly, the crease is formed to extend in a direction intersecting with the longitudinal direction of the wire-like transmission member 20. A curl may remain in the wire-like transmission members 20 as the bending trace FT, for example. That is to say, the wire-like transmission member 20 may be slightly bended in a portion where the bending trace FT is formed.

As illustrated in FIG. 2, when the plurality of wire-like transmission members 20 are provided in the intermediate section S3, the bending trace FT is formed in each of the plurality of wire-like transmission members 20. That is to say, the plurality of bending traces FT are formed in the wiring member 10. These plurality of bending traces FT have a shape corresponding to bending of the wiring member 10. For example, the plurality of bending traces FT are arranged along one direction (fold line). When a crease is formed as the bending trace FT, the crease formed in each of the plurality of wire-like transmission members 20 extends along the same direction.

Herein, the plurality of wire-like transmission members 20 are parallelly arranged in the intermediate section S3. At this time, the plurality of bending traces FT are arranged in a direction parallel to a parallel direction of the plurality of wire-like transmission members 20. The parallel direction of the plurality of wire-like transmission members 20 indicates a direction perpendicular to the longitudinal direction of the plurality of wire-like transmission members 20 in a portion where the plurality of wire-like transmission members extend in a straight form. The parallel direction of the plurality of wire-like transmission members 20 is a radial direction with respect to a center of curvature in a portion where the plurality of wire-like transmission members 20 are bended.

The route bending portion 12 is provided in the intermediate section S3. The route bending portion 12 is a portion where the wire-like transmission member 20 is bended over a range larger than a range where the bending trace FT is formed. The route bending portion 12 is a portion bended in a form different from bending in the bending trace FT, for example. In the example illustrated in FIG. 2, the route bending portion 12 is a planar route bending portion. The planar route bending portion is a portion where the wire-like transmission member 20 is bended so that the first sheet 32 and the second sheet 34 extend in the same planar surface. That is to say, the first sheet 32 and the second sheet 34 are disposed in the same arrangement surface. In the planar route bending portion, the wire-like transmission member 20 is bended in a direction different from a bending direction in the bending trace FT. In the planar route bending portion, the wire-like transmission member 20 is bended in a portion different from a portion where the bending trace FT is formed along the circumferential direction of the wire-like transmission member 20.

The wire-like transmission member 20 is bended only once in the route bending portion 12. That is to say, only one bending portion is provided in one intermediate section S3 of one wire-like transmission member 20. The wire-like transmission member 20 is bended at an angle of 90 degrees in the route bending portion 12. A direction in which the wire-like transmission member 20 extends from the first sheet 32 is a first direction. A direction in which the wire-like transmission member 20 extends from the second sheet 34 is a second direction. The first direction and the second direction are perpendicular to each other. The wire-like transmission member 20 may be bended at angle other than that described above in the route bending portion 12.

The wire-like transmission member 20 may be bended plural times in the route bending portion 12. That is to say, the plurality of bending portions may be provided in one intermediate section S3 of one wire-like transmission member 20. In this case, the wire-like transmission member 20 may be bended so that one side in a width direction (parallel direction) is located inward in all of the bending portions in one intermediate section S3 in one wire-like transmission member 20. A bending portion in which the wire-like transmission member 20 is bended so that one side in a width direction (parallel direction) is located inward and a bending portion in which the wire-like transmission member 20 is bended so that the other side in the width direction (parallel direction) is located inward may be located together in one intermediate section S3 in one wire-like transmission member 20.

Each of the plurality of wire-like transmission members 20 has a length dimension different from each other in the intermediate section S3. More specifically, a center of curvature of the plurality of wire-like transmission members 20 are the same in the route bending portion 12. Thus, a length dimension of the wire-like transmission member 20 close to the center of curvature (the wire-like transmission member 20 on an inner side) is smaller than that of the wire-like transmission member 20 away from the center of curvature (the wire-like transmission member 20 on an outer side) in the intermediate section S3.

According to the wiring member 10 having the configuration described above, in the intermediate section S3 where the bending trace FT is formed in the wire-like transmission member 20, the wire-like transmission member 20 is not fixed to any of the first sheet 32 and the second sheet 34. Thus, when the intermediate section S3 is used as a guide at a time of bending, the wiring member 10 is easily bended at a constant position. A region of the intermediate section S3 in the wiring member 10 tends to have lower rigidity than a region of the first section S1 and a region of a second section S2. Stress is easily concentrated in the region of the intermediate section S3 at the time of bending, thus the wiring member 10 is easily bended at a constant position.

The first sheet 32 and the second sheet 34 are provided away from each other along the longitudinal direction of the wire-like transmission member 20, thus the wire-like transmission member 20 is easily fixed to the first sheet 32 and the second sheet 34 separately. An operator can easily find the intermediate section S3 as the guide of bending the wiring member 10.

The route bending portion 12 is provided in the intermediate section S3, thus the intermediate section S3 is also used as the route bending portion 12. The route bending portion 12 is the planar route bending portion, thus the intermediate section S3 is also used as the planar route bending portion.

The plurality of bending traces FT are arranged in one direction. Accordingly, the wiring member 10 is bended in a section where the plurality of wire-like transmission members 20 are parallelly arranged.

The plurality of bending traces FT are arranged in a direction parallel to a direction in which the plurality of wire-like transmission members 20 are arranged. Accordingly, the plurality of wire-like transmission members 20 are bended at an angle of 90 degrees with respect to the longitudinal direction. In the present example, the wire-like transmission member 20 is bended once in the route bending portion 12, and the plurality of wire-like transmission members 20 are bended at an angle of 90 degrees with respect to the longitudinal direction in a center of the bending portion or a position close to the center thereof. Accordingly, as illustrated in FIG. 3, portions on both adjacent sides of the bending portion in the wiring member 10 (a portion of the region of the first section S1 closer to the intermediate section and a portion of the region of the second section S2 closer to the intermediate section) are overlapped with each other, thus the wiring member 10 can be downsized.

Embodiment 2

Figure 5:
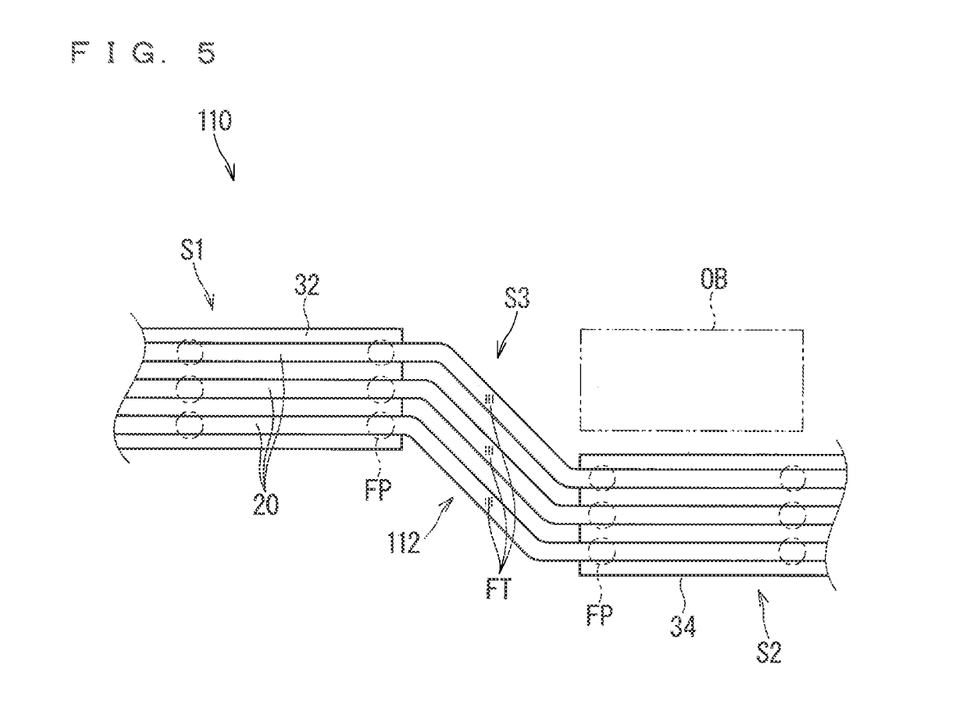
FIG. 5 is a schematic plan view illustrating a wiring member according to an embodiment 2.
Figure 6:
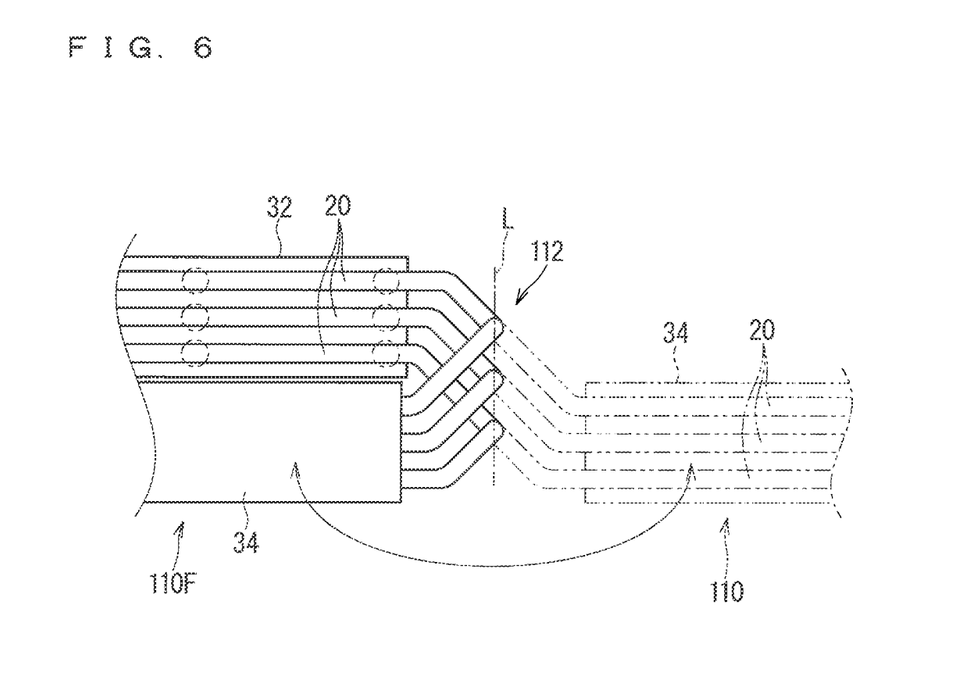
FIG. 6 is an explanation diagram illustrating that the wiring member according to the embodiment 2 is bended.

A wiring member according to an embodiment 2 is described. FIG. 5 is a schematic plan view illustrating a wiring member 110 according to the embodiment 2. FIG. 6 is an explanation diagram illustrating that the wiring member 110 according to the embodiment 2 is bended. In the following description of the present embodiment, the same reference numerals are assigned to the similar constituent elements described above, and the description thereof will be omitted. The same applies to the description of each embodiment hereinafter.

A shape of a route bending portion 112 in the wiring member 110 is different front that of the route bending portion 12 in the wiring member 10 described above. The wire-like transmission member 20 is bended twice in the route bending portion 112. The wire-like transmission member 20 is bended so that one side in a width direction (parallel direction) is located inward in one of the two bending portions. The wire-like transmission member 20 is bended so that the other side in a width direction (parallel direction) is located inward in the other one of the two bending portions. The route bending portion 112 is the same as the route bending portion 12 in that both of them are the planar route bending portions.

The first direction (the direction in which the wire-like transmission member 20 extends from the first sheet 32) and the second direction (the direction in which the wire-like transmission member 20 extends from the second sheet 34) are parallel to each other in the wiring member 110. The first direction and the second direction deviate in a direction perpendicular to the first direction and the second direction. The first direction and the second direction deviate in a width direction in the wiring member 110. Herein, an angle of the two bending portions is the same, thus the first direction and the second direction are parallel to each other. At this time, the route bending portion 112 is the planar route bending portion, thus the first direction and the second direction deviate in the width direction.

According to such a wiring member 110, when the wire-like transmission member 20 extends along one direction, for example, the wiring member 110 can be disposed away from an obstacle OB as illustrated in FIG. 5.

In the present example, the plurality of bending traces FT are arranged in a direction intersecting with a direction in which the plurality of wire-like transmission members 20 are arranged. Accordingly, as illustrated in FIG. 6, the plurality of wire-like transmission members 20 are bended around the bending reference line L extending at an angle smaller than 90 degrees with respect to the longitudinal direction. In a case the wire-like transmission member 20 is bended plural times in the route bending portion 12 as with the present example, when the plurality of wire-like transmission members 20 are bended around the bending reference line L extending at an angle smaller than 90 degrees with respect to the longitudinal direction, the wiring member 110F can be downsized compared with a case where the plurality of wire-like transmission members 20 are bended around a virtual line extending at an angle of 90 degrees with respect to the longitudinal direction.

Embodiment 3

Figure 7:
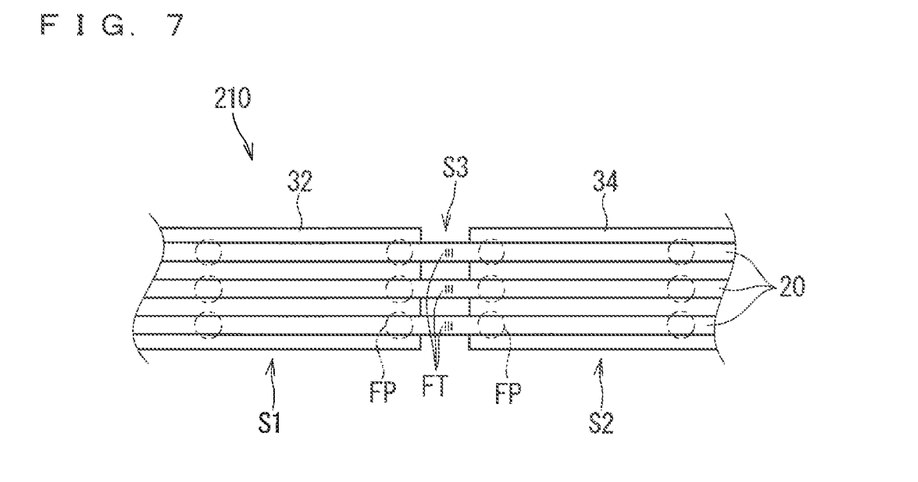
FIG. 7 is a schematic plan view illustrating a wiring member according to an embodiment 3.
Figures 8, 9:
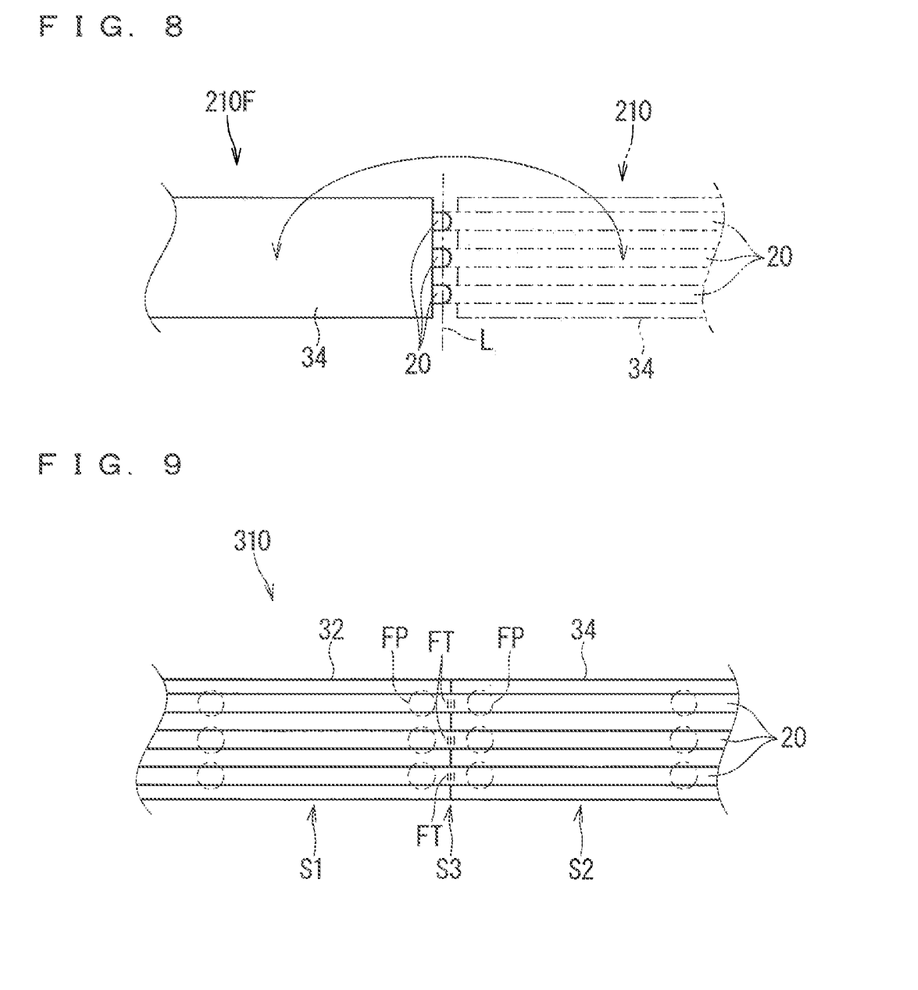
FIG. 8 is an explanation diagram illustrating that the wiring member according to the embodiment 3 is bended.
FIG. 9 is a schematic plan view illustrating a wiring member according to an embodiment 4.

A wiring member according to an embodiment 3 is described. FIG. 7 is a schematic plan view illustrating a wiring member 210 according to the embodiment 3. FIG. 8 is an explanation diagram illustrating that the wiring member 210 according to the embodiment 3 is bended.

The wiring member 210 is different from the wiring members 10 and 110 in that the route bending portions 12 and 112 are not provided in the intermediate section S3. Both side portions of the bending trace FT in the intermediate section S3 in the wire-like transmission member 20 extend in the same straight form. Accordingly, the wiring member 210 is bended in a section where the wire-like transmission member 20 is disposed in a straight form.

The first sheet 32 and the second sheet 34 are provided away from each other along the longitudinal direction of the wire-like transmission member 20 in the wiring member 210. At this time, the interval between the first sheet 32 and the second sheet 34 may be equal to or larger than 1 millimeter, for example. This configuration is preferable in that the operator recognizes the intermediate section S3 easily at the time of folding the wiring member 210, for example. The interval between the first sheet 32 and the second sheet 34 may be equal to or smaller than 150 millimeters, for example. This configuration is preferable in that the wire-like transmission member 20 can be protected by the first sheet 32 and the second sheet 34.

Applicable as the interval between the first sheet 32 and the second sheet 34 is an interval between a fixing position FP closest to the intermediate section S3 in the first sheet 32 and a fixing position FP adjacent to the fixing position FP closest to the intermediate section S3 or an interval between a fixing position FP closest to the intermediate section S3 in the second sheet 34 and a fixing position FP adjacent to the fixing position FP closest to the intermediate section S3.

The plurality of bending traces FT are arranged in a direction parallel to a direction in which the plurality of wire-like transmission members 20 are arranged in the wiring member 210. Accordingly, the plurality of wire-like transmission members 20 are bended around the bending reference line L extending at an angle of 90 degrees with respect to the longitudinal direction. In a case where the route bending portion is not provided in the wiring member 210 as with the present example, when the plurality of wire-like transmission members 20 are bended around the bending reference line L extending at the angle of 90 degrees with respect to the longitudinal direction, the both side portions of the bending portion are overlapped with each other as illustrated in FIG. 8, and the wiring member 210F can be downsized.

Embodiment 4

Figure 10:
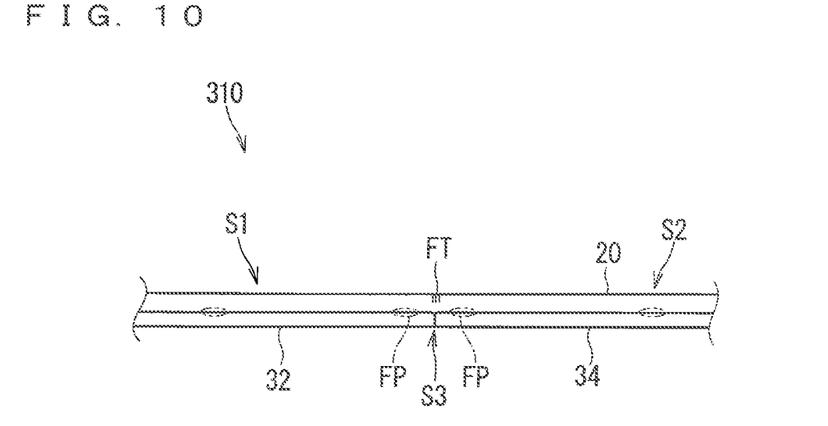
FIG. 10 is a schematic side view illustrating the wiring member according to the embodiment 4.

A wiring member according to an embodiment 4 is described. FIG. 9 is a schematic plan view illustrating a wiring member 310 according to the embodiment 4. FIG. 10 is a schematic side view illustrating a wiring member 310 according to the embodiment 4.

The wiring member 310 is the same as the wiring member 210 described above in that the route bending portions 12 and 112 are not provided in the intermediate section S3. The wiring member 310 is different from the wiring member 210 described above in that a whole portion of the wire-like transmission member 20 located along the longitudinal direction of the intermediate section S3 is covered by at least one of the first sheet 32 and the second sheet 34.

The first sheet 32 and the second sheet 34 have contact with each other along the longitudinal direction of the wire-like transmission member 20 herein. That is to say, in the present example, the end edge of the first sheet 32 and the end edge of the second sheet 34 have contact with each other along the longitudinal direction of the wire-like transmission member 20 herein. The first sheet 32 and the second sheet 34 are disposed so that one sheet is cut at an intermediate portion along a longitudinal direction.

According to such a wiring member 310, the wire-like transmission member 20 is protected by at least one of the first sheet 32 and the second sheet 34 in the intermediate section S3. Accordingly, the wire-like transmission member 20 is hardly damaged in the intermediate section S3.

Embodiment 5

Figure 11:
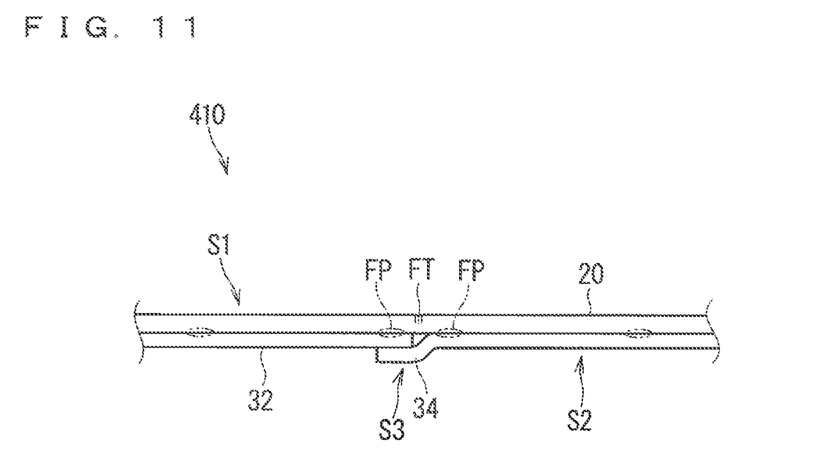
FIG. 11 is a schematic side view illustrating a wiring member according to an embodiment 5.
Figure 12:
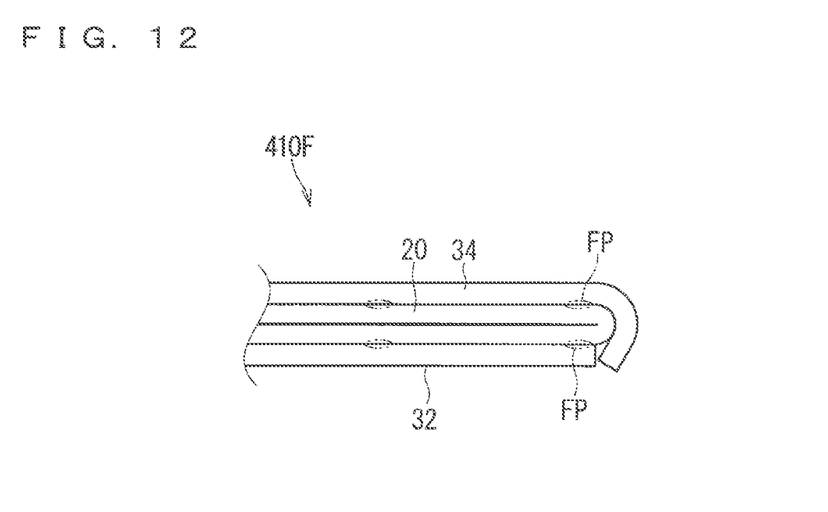
FIG. 12 is a side view illustrating the folded wiring member.

A wiring member according to an embodiment 5 is described. FIG. 11 is a schematic side view illustrating a wiring member 410 according to the embodiment 5. FIG. 12 is a side view illustrating a bended wiring member 410F.

The wiring member 410 is the same as the wiring member 310 described above in that a whole portion of the wire-like transmission member 20 located along the longitudinal direction of the intermediate section S3 is covered by at least one of the first sheet 32 and the second sheet 34. The wiring member 410 is different from the wiring member 310 described above in that a part of the first sheet 32 and a part of the second sheet 34 are overlapped with each other along the longitudinal direction of the wire-like transmission member 20.

This wiring member 410 is folded to be the wiring member 410F in a folded state illustrated in FIG. 12. At this time, a sum of a length dimension of the first sheet 32 and a length dimension of the second sheet 34 located in the intermediate section S3 is larger than a length dimension of the intermediate section S3 in the wire-like transmission member 20. Thus, the wire-like transmission member 20 is easily covered by at least one of the first sheet 32 and the second sheet 34 in the intermediate section S3 also in the wiring member 410F.

According to such a wiring member 410, the wire-like transmission member 20 is protected by at least one of the first sheet 32 and the second sheet 34 in the intermediate section S3. Accordingly, the wire-like transmission member 20 is hardly damaged in the intermediate section S3. Furthermore, according to the wiring member 410, a range of the wire-like transmission member 20 covered by at least one of the first sheet 32 and the second sheet 34 in the intermediate section S3 is increased also in the wiring member 410F in the folded state. Accordingly, the wire-like transmission member 20 is hardly damaged in the intermediate section S3 also in the wiring member 410F in the folded state.

Embodiment 6

Figure 13:
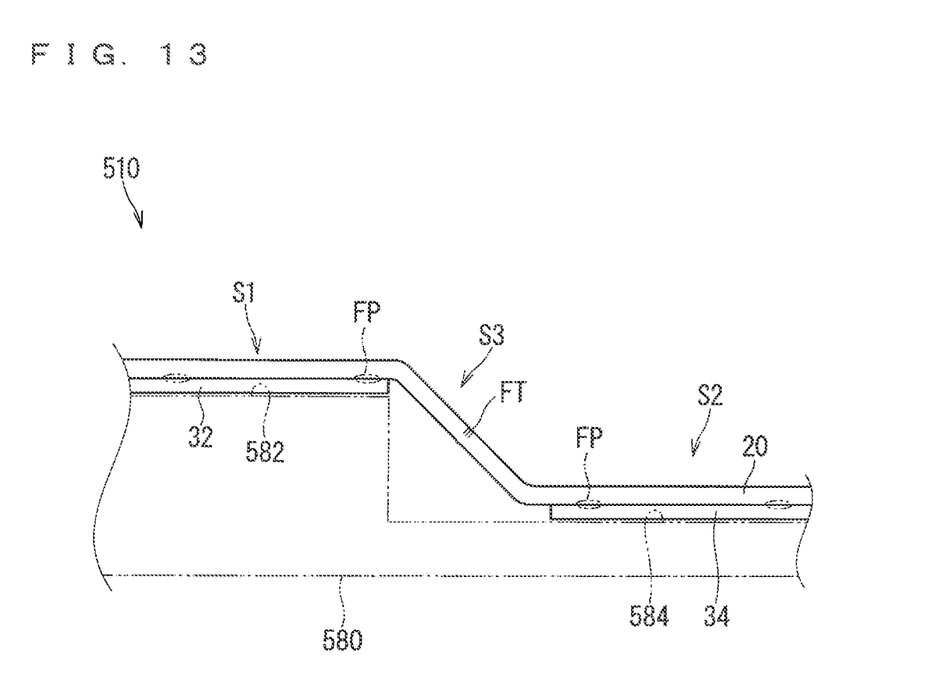
FIG. 13 is a schematic side view illustrating a wiring member according to an embodiment 6.

A wiring member according to an embodiment 6 is described. FIG. 13 is a schematic side view illustrating a wiring member 510 according to the embodiment 6.

The wiring member 510 is the same as the wiring members 10 and 110 described above in that the route bending portion is provided in the intermediate section S3. The wiring member 510 is different from the wiring members 10 and 110 described above in a viewpoint of a shape of a route bending portion 512.

The route bending portion 512 is a three-dimensional route bending portion. The three-dimensional route bending portion is a portion where the wire-like transmission member 20 is bended so that the first sheet 32 and the second sheet 34 extend in different planar surfaces. Accordingly, the intermediate section S3 is also used as the three-dimensional route bending portion.

The first direction (the direction in which the wire-like transmission member extends from the first sheet 32) and the second direction (the direction in which the wire-like transmission member extends from the second sheet 34) are parallel to each other in the wiring member 510 in the manner similar to the wiring member 110. The first direction and the second direction deviate in a direction perpendicular to the first direction and the second direction. Accordingly, when the wire-like transmission member 20 extends along one direction, for example, the wiring member 510 can be disposed away from the obstacle OB.

The first direction and the second direction deviate in a thickness direction in the wiring member 510. Accordingly, the wiring member 510 can be disposed in a portion with a difference in height. Specifically, a difference in height in an arrangement surface, for example, is assumed as the obstacle OB described above. That is to say, in the example illustrated in FIG. 13, an arrangement target 580 includes a first arrangement surface 582 and a second arrangement surface 584. The first arrangement surface 582 and the second arrangement surface 584 are flat. The first sheet 32 in the wiring member 510 is disposed to extend on the first arrangement surface 582, and the second sheet 34 is disposed to extend on the second arrangement surface 584. The wiring member 510 passes across the difference in height between the first arrangement surface 582 and the second arrangement surface 584 in the intermediate section S3.

A portion other than that described above is also applicable as the three-dimensional route bending portion. For example, a wiring member includes a first arrangement surface and a second arrangement surface in which an arrangement target is alternately arranged. At this time, the wiring member may be disposed in the arrangement target so that the first sheet 32 extends on the first arrangement surface and the second sheet 34 extends on the second arrangement surface. At this time, the wire-like transmission member 20 may be bended once in a thickness direction of the wiring member. The wire-like transmission member 20 may be bended plural times to be twisted.

[Additional Statement]

A wiring member in which the wire-like transmission member 20 is folded such as the wiring members 10F, 110F, 210F, and 410F in the folded state may also be considered as the wiring member according to the present disclosure. The wiring member in which the wire-like transmission member 20 is folded is a wiring member overlapped with the fixing sheet 30, in a thickness direction, in which portions on both adjacent sides of the bending portion in the wire-like transmission member 20 are overlapped with each other. That is to say, the wiring member includes: the wire-like transmission member 20; the first sheet 32 to which the first section S1 located along the longitudinal direction in the wire-like transmission member 20 is fixed; and the second sheet 34 to which the second section S2 located along the longitudinal direction in the wire-like transmission member 20 is fixed, wherein the first sheet 32 and the second sheet 34 are separated, and the wire-like transmission member 20 is folded in the intermediate section S3 between the first section S1 and the second section S2.

Such a wiring member may have a packing form or a form disposed in a vehicle. The wire-like transmission member 20 is not fixed to any of the first sheet 32 and the second sheet 34 in the intermediate section S3 also according to such a wiring member. Thus, when the intermediate section S3 is used as a guide at a time of bending, the wiring member 10 is easily bended at a constant position. The intermediate section S3 tends to have lower rigidity than the first section S1 and the second section S2. Stress is easily concentrated in the intermediate section S3 at the time of bending, thus the wiring member is easily bended at a constant position.

In addition, the wiring members 10, 110, and 510 provided with the route bending portions 12, 112, and 512 may also be considered as an arrangement structure of the wiring member including the wiring members 10, 110, and 510 and the arrangement targets 80 and 580.

Modification Example

A cover sheet may be provided in each wiring member. The cover sheet may cover the wire-like transmission member 20 from a side opposite to the fixing sheet 30. The cover sheet may also be provided on a surface of the fixing sheet 30 a side opposite to a surface to which the wire-like transmission member 20 is fixed. The cover sheet is preferably fixed to the fixing sheet 30. The cover sheet and the fixing sheet 30 are preferably fixed by fusion or adhesion. At this time, it is sufficient that the cover sheet is not fused or bonded to the wire-like transmission member. The cover sheet may include a first cover sheet fixed to the first sheet 32 and a second cover sheet fixed to the second sheet 34. One cover sheet may be disposed across the first sheet 32 and the second sheet 34.

The configurations described in the embodiments and modification examples thereof can be appropriately combined as long as they are not contradictory.

EXPLANATION OF REFERENCE SIGNS 10, 110, 210, 310, 410, 510 wiring member
10F, 110F, 210F, 410F wiring member (folded state)
12, 112, 512 route bending portion
20 wire-like transmission member
30 fixing sheet
32 first sheet
34 second sheet
80, 580 arrangement target
582 first arrangement surface
584 second arrangement surface
C connector
FP fixing position
FT bending trace
L bending reference line
OB obstacle
S1 first section
S2 second section
S3 intermediate section

The invention claimed is:

1. A wiring member, comprising:
at least one wire-like transmission member;
a first sheet to which a first section located along a longitudinal direction in the at least one wire-like transmission member is fixed; and
a second sheet to which a second section located along a longitudinal direction in the at least one wire-like transmission member is fixed, wherein
the first sheet and the second sheet are separated,
at least one bending trace is formed in an intermediate section between the first section and the second section in the at least one wire-like transmission member,
the intermediate section in the at least one wire-like transmission member is covered by at least one of the first sheet and the second sheet wholly along a longitudinal direction of the intermediate section,
the at least one wire-like transmission member is fixed to the first sheet at a plurality of intervals such that the at least one wire-like transmission member is exposed on a side opposite to a side fixed to the first sheet,
the at least one wire-like transmission member is fixed to the second sheet at a plurality of intervals such that the at least one wire-like transmission member is exposed on a side opposite to a side fixed to the second sheet,
the at least one wire-like transmission member extends continuously in the longitudinal direction of the at least one wire-like transmission member across an entirety of the first sheet and the second sheet,
and, in a state in which the wiring member is folded, a portion of the at least one wire-like transmission member fixed to the first sheet is in contact with an other portion of the at least one wire-like transmission member fixed to the second sheet.

2. The wiring member according to claim 1, wherein both side portions of the at least one bending trace in the intermediate section in the at least one wire-like transmission member extend in an identical straight form.

3. The wiring member according to claim 1, wherein a plurality of wire-like transmission members are provided in the intermediate section,
a plurality of bending traces are formed in the plurality of wire-like transmission members, respectively, and the plurality of bending traces are arranged in one direction.

4. The wiring member according to claim 3, wherein the plurality of wire-like transmission members are parallelly arranged in the intermediate section, and
the plurality of bending traces are arranged in a direction parallel to the direction in which the plurality of wire-like transmission members are arranged.

5. The wiring member according to claim 3, wherein the plurality of wire-like transmission members are parallelly arranged in the intermediate section, and
the plurality of bending traces are arranged in a direction intersecting with the direction in which the plurality of wire-like transmission members are arranged.

6. A wiring member, comprising:
at least one wire-like transmission member;
a first sheet to which a first section located along a longitudinal direction in the at least one wire-like transmission member is fixed; and
a second sheet to which a second section located along a longitudinal direction in the at least one wire-like transmission member is fixed, wherein
the first sheet and the second sheet are separated,
the at least one wire-like transmission member is folded in an intermediate section between the first section and the second section,
the at least one wire-like transmission member is fixed to the first sheet at a plurality of intervals such that the at least one wire-like transmission member is exposed on a side opposite to a side fixed to the first sheet,
the at least one wire-like transmission member is fixed to the second sheet at a plurality of intervals such that the at least one wire-like transmission member is exposed on a side opposite to a side fixed to the second sheet,
the at least one wire-like transmission member extends continuously in the longitudinal direction of the at least one wire-like transmission member across an entirety of the first sheet and the second sheet,
and, in a state in which the wiring member is folded, a portion of the at least one wire-like transmission member fixed to the first sheet is in contact with an other portion of the at least one wire-like transmission member fixed to the second sheet.

7. A wiring member, comprising:
a plurality of wire-like transmission members;
a first sheet to which a first section located along a longitudinal direction in the plurality of wire-like transmission members is fixed; and
a second sheet to which a second section located along a longitudinal direction in the plurality of wire-like transmission members is fixed, wherein
the first sheet and the second sheet are separated,
a plurality of bending traces are formed in an intermediate section between the first section and the second section in the plurality of wire-like transmission members,
the plurality of wire-like transmission members are provided in the intermediate section,
each of the plurality of wire-like transmission members includes a transmission wire body and a covering layer,
the plurality of bending traces are formed in the plurality of wire-like transmission members, respectively,
the plurality of bending traces are arranged in one direction,
the plurality of wire-like transmission members are parallelly arranged in the intermediate section, the plurality of bending traces are arranged in a direction intersecting with the direction in which the plurality of wire-like transmission members are arranged, the plurality of wire-like transmission members are fixed to the first sheet at a plurality of intervals such that the plurality of wire-like transmission members are exposed on a side opposite to a side fixed to the first sheet, the plurality of wire-like transmission members are fixed to the second sheet at a plurality of intervals such that the plurality of wire-like transmission members are exposed on a side opposite to a side fixed to the second sheet, the plurality of wire-like transmission members extend continuously in the longitudinal direction of the plurality of wire-like transmission members across an entirety of the first sheet and the second sheet, and, in a state in which the wiring member is folded, a portion of the plurality of wire-like transmission members fixed to the first sheet are in contact with an other portion of the plurality of wire-like transmission members fixed to the second sheet.

* * * * *